United States Patent [19]

Schweitz et al.

[11] Patent Number: 4,897,988
[45] Date of Patent: Feb. 6, 1990

[54] LAWN MOWER DISCHARGE OPENING COVER AND DEFLECTOR

[75] Inventors: Kenneth D. Schweitz, Oconomowoc; Dean W. Benter, Horicon, both of Wis.

[73] Assignee: Deere & Company, Moline, Ill.

[21] Appl. No.: 310,807

[22] Filed: Feb. 10, 1989

[51] Int. Cl.$^4$ ............... A01D 34/63; A01D 34/70
[52] U.S. Cl. ................... 56/202; 56/17.4; 56/320.2
[58] Field of Search ............ 56/17.4, 17.5, 202, 56/203, 255, 320.1, 320.2

[56] References Cited

U.S. PATENT DOCUMENTS

| | | | |
|---|---|---|---|
| 2,756,556 | 7/1956 | Watkins | 56/320.2 X |
| 3,636,686 | 1/1972 | Meyer et al. | 56/320.2 |
| 3,726,069 | 4/1973 | Cope | 56/202 |
| 3,797,215 | 3/1974 | Erdman et al. | 56/202 X |
| 3,928,956 | 12/1975 | Boyer | 56/202 |
| 4,031,694 | 6/1977 | Gobin | 56/202 |
| 4,034,102 | 8/1977 | Uhlinger et al. | 56/17.4 |
| 4,047,367 | 9/1977 | Thorud | 56/320.2 X |
| 4,064,680 | 12/1977 | Fleigle | 56/320.2 X |
| 4,149,362 | 4/1979 | Haffner et al. | 56/202 |
| 4,345,418 | 8/1982 | Arizpe | 56/202 |
| 4,399,647 | 8/1983 | Soldavini | 56/202 |
| 4,478,031 | 10/1984 | Wolf | 56/202 |
| 4,522,019 | 6/1985 | Edwards et al. | 56/202 |

FOREIGN PATENT DOCUMENTS 1246587  9/1971  United Kingdom ............ 56/320.2

OTHER PUBLICATIONS

John Deere Parts Catalog, PC-2264, 21-Inch Rotary Walk Behind Mower 10001- (1989).

*Primary Examiner*—George A. Suchfield

[57] ABSTRACT

A material deflector is provided for a lawn mower. The deflector is swingably carried by the mower housing and need not be removed when a bagger attachment is used. The deflector is shiftable between a first position above and biased against the mower grass bagger and a second position in registry with the mower discharge outlet. When the deflector is in registry with the rear discharge outlet, it deflects the cut material to the side of the mower. The deflector includes two adjoining material deflector surfaces, the first surface sloping downwardly and to the side and the second surface sloping rearwardly and to the side. The two surfaces meet to form a generally right angle or L-shape material deflector rather than a traditional tubular channel for conveying of the cut material.

21 Claims, 6 Drawing Sheets

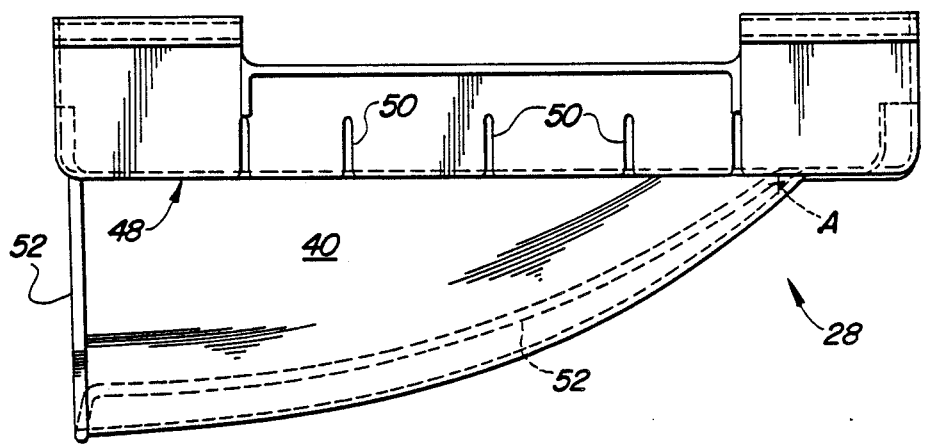
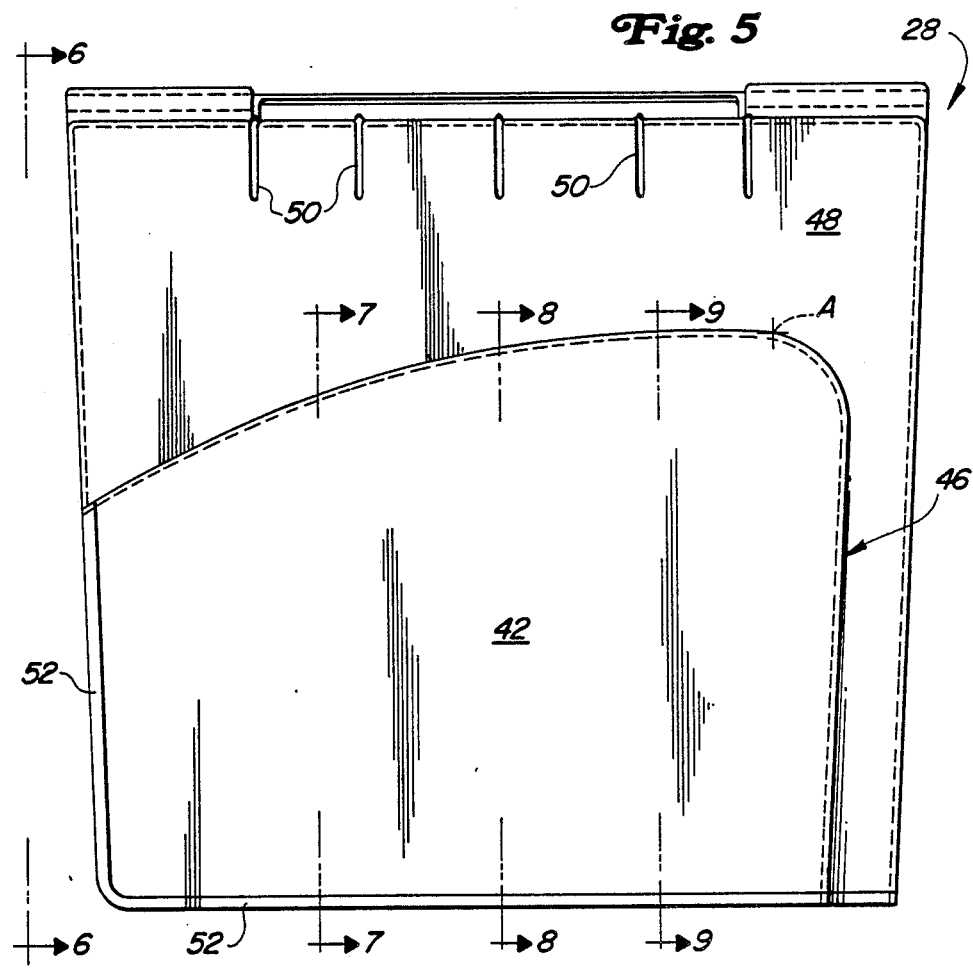
Fig. 5

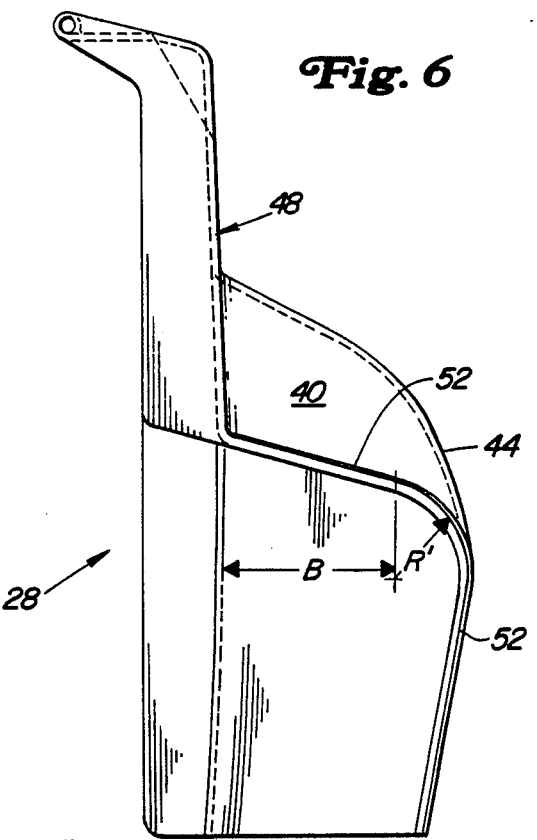
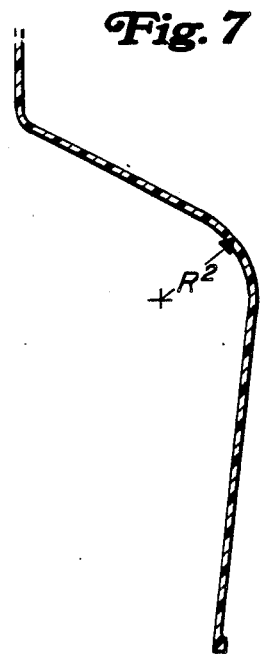
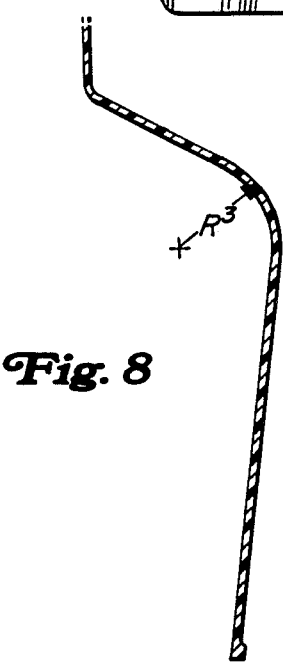
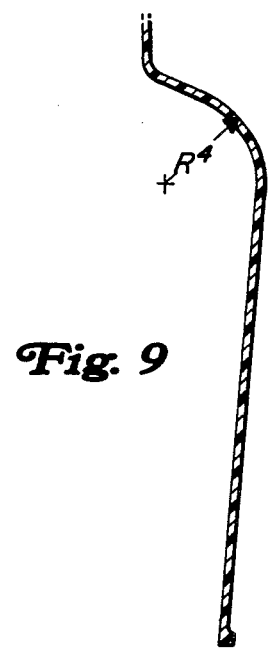

LAWN MOWER DISCHARGE OPENING COVER AND DEFLECTOR

FIELD OF THE INVENTION

The present invention relates generally to rotary lawn mowers and more specifically to a grass discharge opening cover and deflector which is hingedly connected to the mower housing. The deflector is movable between a first position over the discharge opening where it serves to direct grass cuttings to the side and a second position above and away from the discharge opening when the mower is equipped with a grass bagger.

BACKGROUND OF THE INVENTION

Walk-behind lawn mowers are more commonly being equipped with rear grass bagger arrangements instead of side grass bagger arrangements. The rear baggers permit the operator to maneuver more closely to trees, hedges and other lawn obstacles and thereby trim the grass closely adjacent to those obstacles. Additionally, the rear bagger distributes the weight of the collected grass onto the rear wheels of the mower, whereas a side bagger arrangement carries the weight of the cut grass to the side of the mower and may tend to upweight one side of the mower during its operation.

In rear bagger walk-behind mowers, the grass discharge opening is commonly in the rear portion of the mower housing. Since the grass cuttings and other objects discharged from such rear exits would fall in the path of the operator, it is desirable to equip the mower with a discharge structure which provides for sidewardly discharge of the grass clippings. The side discharge also provides for a wider and more evenly disbursed band of clippings and reduces the likelihood that discharged objects can be thrown into the operator.

To provide for side discharge capability, it is common to equip rear bagger mowers with a side deflector mechanism which can be mounted to the machine when the rear bagger attachment is removed. Such arrangements, however, are inconvenient in that they take the form of separate attachments and thereby require that the grass catching bag be removed when the side deflector is to be installed and vice versa. Further, these side deflectors are shaped in the form of a closed tunnel or conduit and sometimes experience plugging when heavy grass and/or wet grass clippings pass through them.

SUMMARY OF THE INVENTION

To overcome these problems, there is provided herein a discharge opening flap which is carried by the lawn mower even when it is equipped with a rear bagger arrangement. It is pivotally mounted on the mower and spring loaded, so that when the bagger is removed, it is biased toward an operative position in contact with the rear of the mower housing and aligned with the discharge opening of the mower housing. When the bag is in use, the flap is pivoted to a position above and biased against the bagger.

The flap or deflector takes the form of a curving surface rather than a tunnel or duct-like conduit. The curving surface is comprised of two adjoining sloping and tapered surfaces which direct the material toward the side of the lawn mower and downwardly. Since these surfaces do not form an enclosed tunnel, they do not restrict the stream of grass and air as it is discharged from the mower housing. In this way, clogging and/or build-up of clippings within the deflector or mower housing is minimized.

Because the deflector is carried on the mower even when the bag is used, it does not have to be removed and/or installed when the operator converts between bagger use and ground distribution of the clippings. Since the deflector not only directs material to the side, but also serves to cover the discharge opening, it serves the dual function of safety cover flap and side deflector. Further, its permanent mounting arrangement on the mower eliminates the need to store the deflector when it is not in use, and reduces the likelihood that it will be damaged or lost during non-use.

BRIEF DESCRIPTION OF THE DRAWINGS

FIG. 4 illustrates a top view of the deflector.

FIG. 5 illustrates a rear view of the deflector.

FIG. 6 illustrates a discharge side view of the deflector.

FIG. 7 illustrates a view taken along lines 7—7 of FIG. 5.

FIG. 8 illustrates a view taken along lines 8—8 of FIG. 5.

FIG. 9 illustrates a view taken along lines 9—9 of FIG. 5.

DETAILED DESCRIPTION OF THE PREFERRED EMBODIMENT

Figure 1:
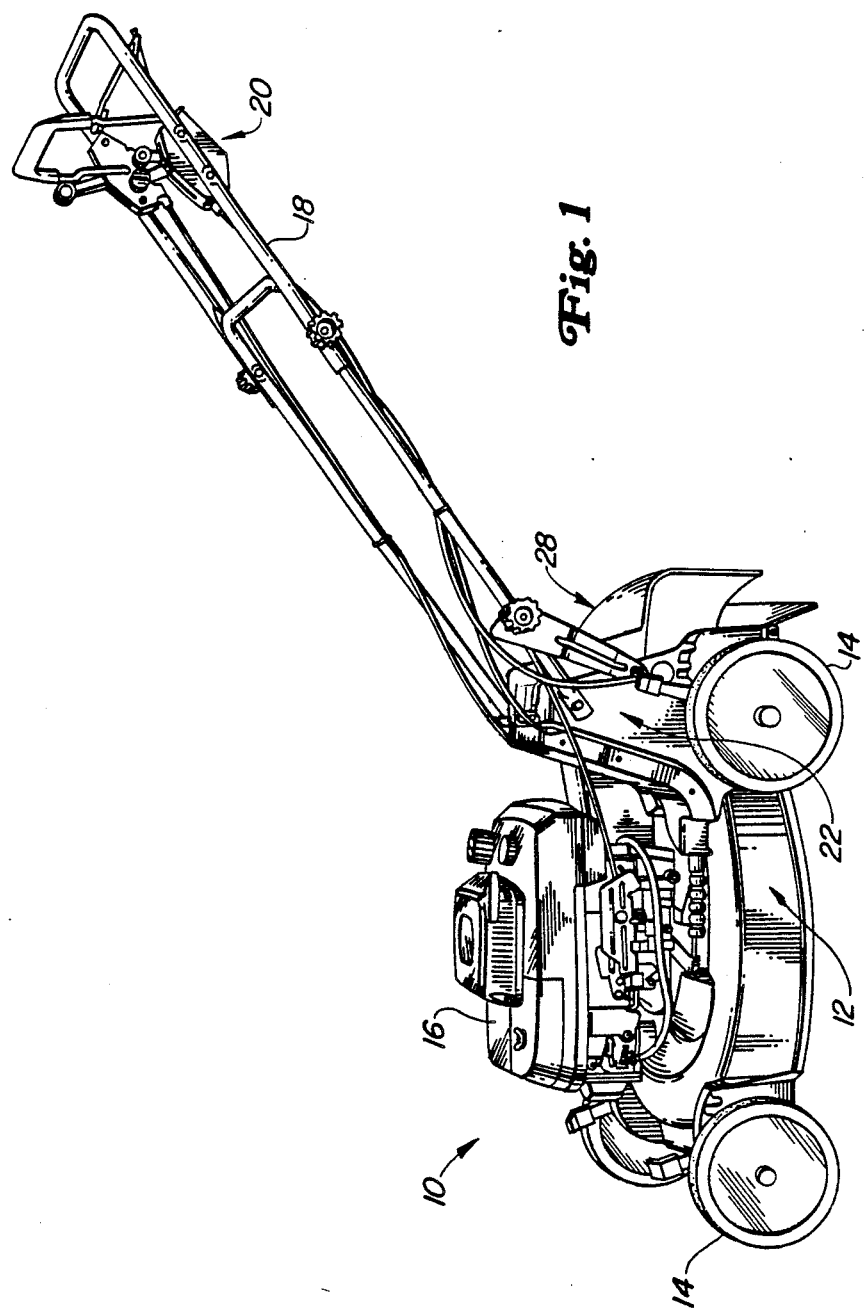
FIG. 1 illustrates a prespective view of a walk-behind rotary lawn mower equipped with the present invention.

Referring now to FIG. 1, there is illustrated a walk-behind rotary mower 10 which includes a housing 12 carried on ground-engaging wheels 14. Mounted on the housing 12 is an engine 16, the shaft of which would project through the housing 12 and carry a grass cutting blade.

This particular type of lawn mower 10 is equipped with a rearwardly extending handle 18 that carries the various controls 20 for operating the mower.

Figure 2:
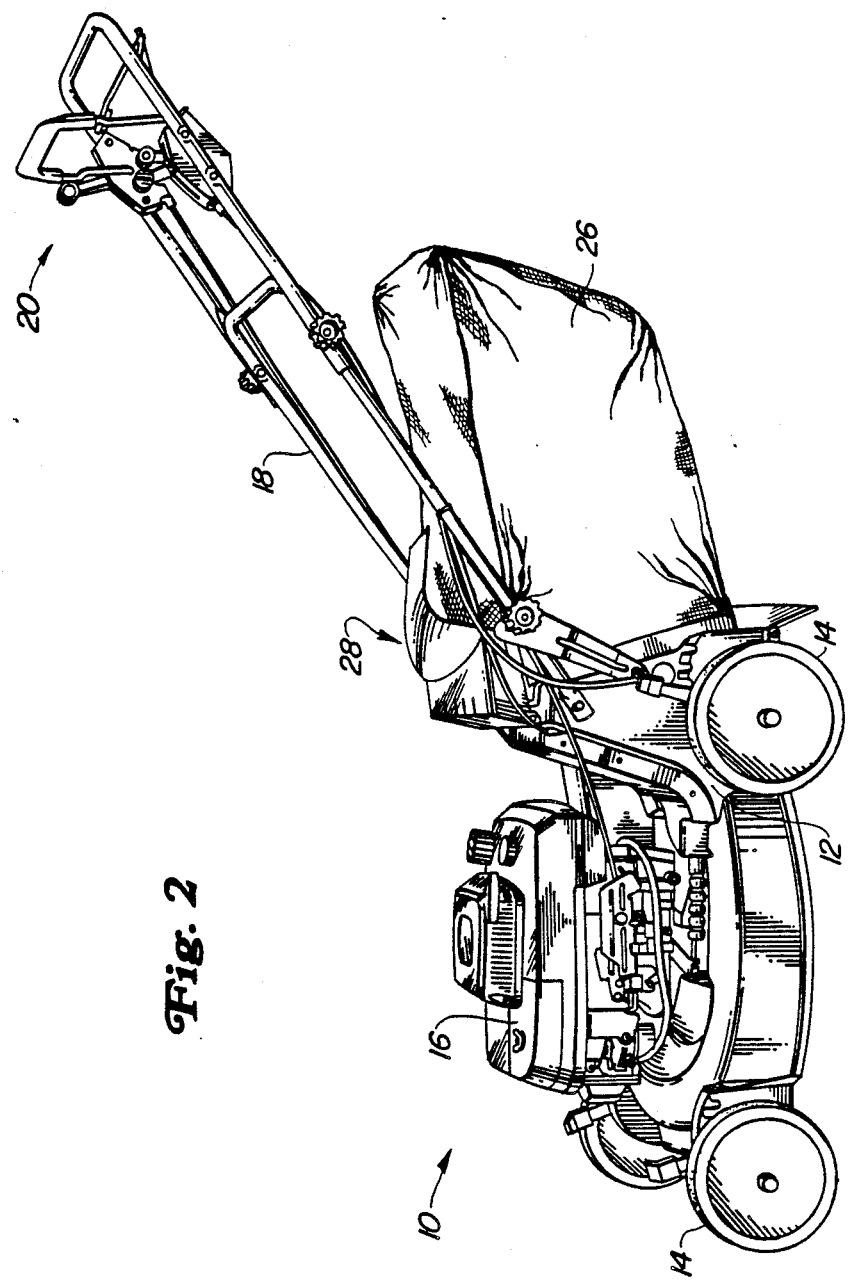
FIG. 2 is similar to FIG. 1, but illustrates the hinged deflector in its upwardly and forwardly pivoted position, biased against the grass catcher.
Figure 10:
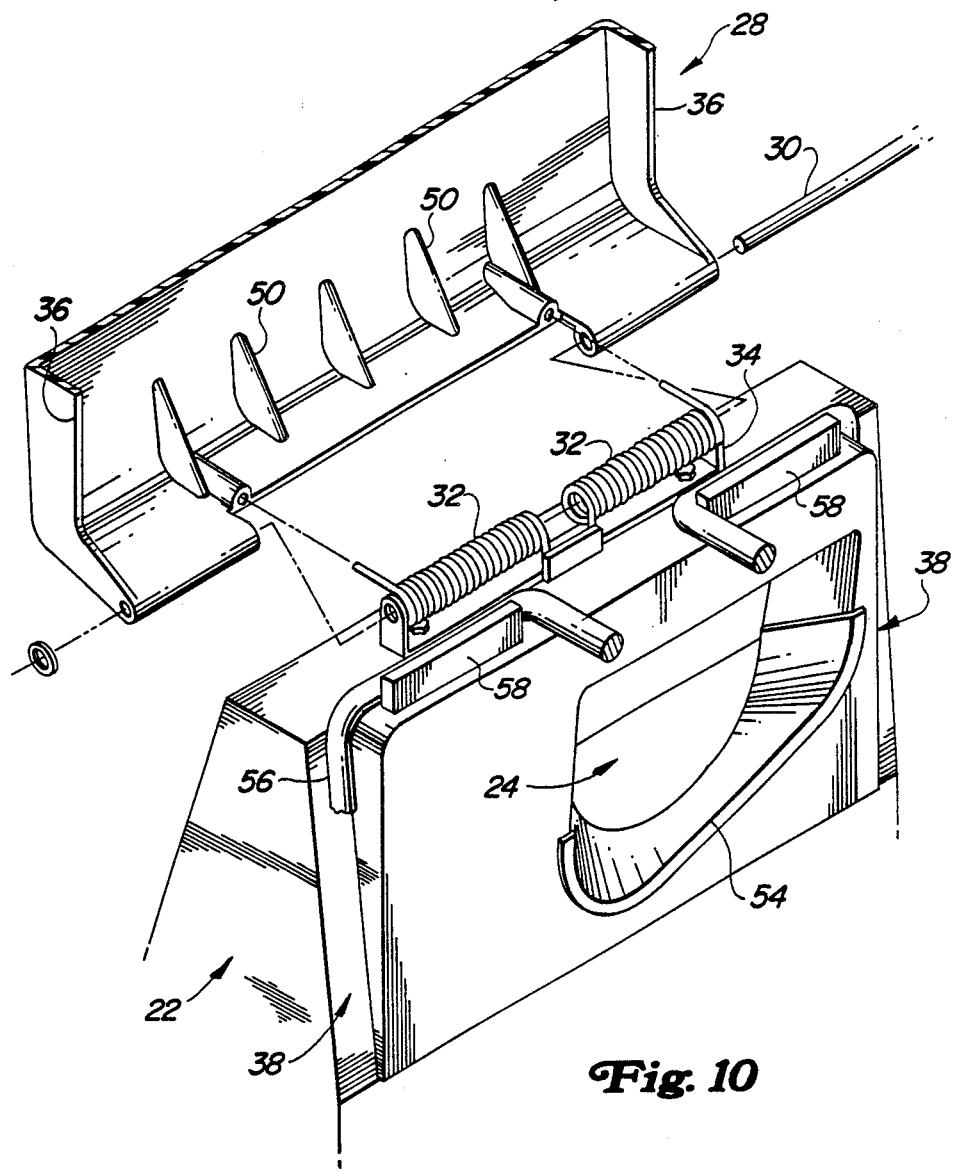
FIG. 10 is partial view of the discharge opening in the lawn mower housing and the material deflector connection to the housing.

As best illustrated in FIG. 10, the rear portion 22 of the mower housing carries in it a duct or opening 24 through which the grass is propelled by the blade after it is cut. The rear discharge opening 24 permits the mower 10 to be equipped, as illustrated in FIG. 2, with a rear bagger 26 for collecting the grass clippings during the mowing operation.

While the use of a bagger 26 is often preferred to prevent distribution of clippings on the ground, there are occasions during which it is preferable to distribute cut grass over the ground. Such an occasion would exist when fertilizer has been distributed over the ground and absorbed by the grass. The first cutting after fertilizer use would yield grass with an excess amount of fertilizer, and it is often preferred to redistribute those fertilizer-laden clippings back onto the ground. On such occasions, it is also desirable to direct the cut material from the mower duct or outlet 24 over a wider swath.

Figure 3:
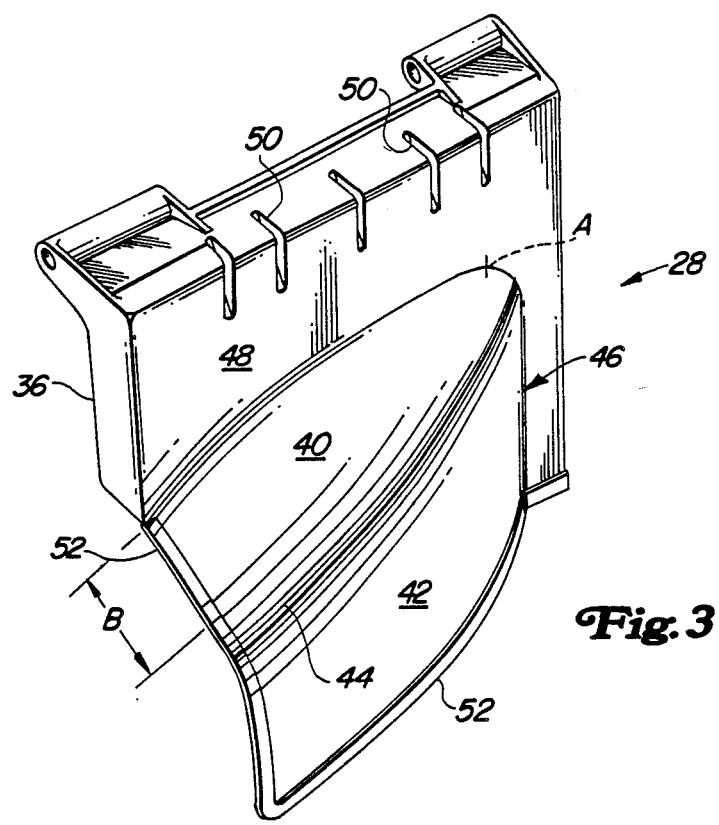
FIG. 3 illustrates an enlarged perspective view of the material deflector.

Looking now to FIGS. 3–9, there is illustrated in detail the preferred embodiment of the material deflector 28. As illustrated in FIGS. 3 and 10, the deflector 28 is comprised of a single sheet of plastic-type material formed so as to permit a rod 30 to be inserted through its top portion for pivotally connecting it with the mower housing 12. Springs 32 are then positioned around the rod 30 and attached to a bracket 34 carried on the housing 12 so that the deflector 28 is urged toward its lowered position in abutment with the mower housing 12.

The flat edges 36 of the deflector 28 seat against the vertical walls 38 of the housing preventing accidental exposure to the housing discharge opening 24. The deflecting portion of the deflector 28 is comprised of two surfaces 40 and 42 which are designed to deflect the cut material to the side and downwardly. The first or upper surface 40, which is best illustrated in FIGS. 3 and 6, assumes a generally triangular shape and tapers from a first generally pointed area designated A to a wider area at the discharge side of the deflector designated B. This triangular surface 40 also slopes, as best illustrated in FIGS. 3 and 6, from the point A to the wider area B at its discharge side.

The second deflecting surface 42 is substantially vertical and is joined to the first generally horizontal surface 40 at a generally radially formed portion. The second surface 42, best illustrated in FIGS. 3, 5 and 6, slopes to the rear and side from its juncture 46 with the vertical flat portion 48 of the deflector 28. The radius of the portion 44 joining the two surfaces 40 and 42 changes along its length from the discharge side to its juncture at A with the vertical wall 48 of the deflector 28. This radius decreases from the discharge side of the deflector 28 to the juncture A of the two surfaces 40 and 42 with the vertical wall 48 of the deflector 28 and is best illustrated in FIGS. 6, 7, 8 and 9 as $R'$, $R^2$, $R^3$ and $R^4$.

The deflector 28 is provided with re-enforcing or stiffening ribs 50 along the upper portion to permit it to be manufactured from a plastic-type material, such as polypropylene. The ribs 50 further assist in transferring the forces imposed upon the deflector 28 by the springs 32. It is further provided with a stiffening rib 52 along the periphery of the first and second surfaces 40 and 42 to help them maintain their proper shape and function.

The first and second deflector surfaces 40 and 42 are shaped to receive and deflect cut material projected through the mower duct 24. Looking now to FIG. 10, it is seen that the duct 24 is formed along its lower surface 54 to have an upwardly and sidewardly sloping configuration that directs the air stream and the grass upwardly and to the side. This material is then deflected against the rearwardly, sidewardly sloping second surface 42 to be directed along it and out to the side of the mower 10. The material also deflects along the sidewardly and downwardly sloping first surface 40 to exit at the desired height and be thrown over a swath of the desired width alongside the mower 10.

Because the deflector 28 does not include an enclosed duct or conduit for diverting the cut material, clogging is reduced when wet and/or heavy grass clippings are encountered.

Further, because the deflector 28 is permanently mounted on the mower 10 and can easily be moved between a storage and use position, the operator can conveniently and quickly convert the operation of the mower 10 from a bagger configuration to a side discharge configuration. When the deflector 28 is not in use, it remains on the machine and, due to its spring biased mounting, assists in securing the rods 56 of the bagger 26 behind the mount tabs 58 provided at the top of the mower housing 12.

We claim:

1. In a mower usable for cutting material such as grass, the mower having a housing and a material discharge duct opening in the rear of the mower housing, the improvement comprising:
   a deflector carried on the mower, for receiving material exiting rearwardly from said duct and redirecting it to the side of the mower, the deflector adapted to move between
   a first position spaced from said duct and
   a second position covering said duct;
   the deflector being comprised of adjoining first and second generally flat material directing surfaces
   the first surface sloping downwardly and to the side
   and the second surface sloping rearwardly and to the side.

2. The invention defined in claim 1 wherein the second surface tapers to a narrower portion at its discharge side.

3. The invention defined in claim 1 wherein the deflector includes means biasing it toward its second position.

4. The invention defined in claim 1 wherein the deflector is adapted to be biased into contact with a bagger carried on the housing.

5. The invention defined in claim 1 wherein the deflector is comprised of a propylene material having stiffening ribs carried in the upper portion thereof.

6. For use in a lawn mower having:
   a housing with a material discharge duct opening in the rear of the housing,
   a driven blade carried by the housing for cutting and propelling grass through said duct;
   structure carried by the housing for removably supporting a rearwardly extending grass bagger, the bagger having an opening for receiving material from said duct when supported on the housing;
   a material deflector, pivotally mounted on the housing for movement between
   a first position away from said duct, and
   a second position covering said duct when the bagger is removed from the mower housing;
   the deflector being comprised of adjoining first and second surfaces against which material propelled through the duct is deflected and discharged to the side of the mower,
   the first surface being sloped downwardly and towards the discharge side, and
   the second surface being sloped rearwardly and towards the discharge side.

7. The invention defined in claim 6 wherein the mower discharge duct slopes upwardly and sidewardly.

8. The invention defined in claim 6 wherein the second surface tapers to a narrower portion at its discharge side.

9. The invention defined in claim 6 wherein the deflector includes means biasing it toward its second position.

10. The invention defined in claim 6 wherein the deflector is adapted to be biased into contact with a bagger carried on the housing.

11. The invention defined in claim 6 wherein the deflector is comprised of a propylene material having stiffening ribs carried in the upper portion thereof.

12. In a mower usable for cutting material such as grass, the mower having a material discharge duct opening to the rear, the improvement comprising:
   a deflector carried on the mower, for receiving material from said duct and directing it to the side of the mower, the deflector adapted to move between
      a first position spaced from said duct and
      a second position covering said duct;
   the deflector having adjoining first and second generally flat material directing surfaces
      the first surface sloping downwardly and to the side and being tapered from side to side, with the discharge side being wider than the other side,
      and the second surface sloping rearwardly and to the side.

13. The invention defined in claim 12 wherein the second surface tapers to a narrower portion at its discharge side.

14. The invention defined in claim 12 wherein the deflector includes means biasing it toward its second position.

15. The invention defined in claim 12 wherein the deflector is adapted to be biased into contact with a bagger carried on the housing.

16. The invention defined in claim 12 wherein the deflector is comprised of a propylene material having stiffening ribs carried in the upper portion thereof.

17. For use in a lawn mower having:
   a housing with a rearwardly opening material discharge duct,
   a driven blade carried by the housing for cutting and propelling grass through said duct;
   structure carried by the housing for removably supporting a rearwardly extending grass bagger, the bagger having an opening for receiving material from said duct when supported on the housing;
   a material deflector, pivotally mounted on the housing for movement between
      a first position away from said duct, and
      a second position covering said duct when the bagger is removed from the mower housing;
   the deflector including adjoining first and second surfaces against which material propelled through the duct is deflected and discharged to the side of the mower,
      the first surface being tapered from side to side, sloping downwardly and towards the discharge side with the discharge side being wider than the other side, and
      the second surface being sloped rearwardly and towards the discharge side.

18. The invention defined in claim 17 wherein the second surface tapers to a narrower portion at its discharge side.

19. The invention defined in claim 17 wherein the deflector includes means biasing it toward its second position.

20. The invention defined in claim 17 wherein the deflector is adapted to be biased into contact with a bagger carried on the housing.

21. The invention defined in claim 17 wherein the deflector is comprised of a propylene material having stiffening ribs carried in the upper portion thereof.

* * * * *